(12) United States Patent
Andreani (10) Patent No.: US 12,384,516 B2
(45) Date of Patent: Aug. 12, 2025

(54) AIRCRAFT COMPONENT SUPPORT ARRANGEMENT, HIGH-LIFT SYSTEM, AIRCRAFT WING AND AIRCRAFT

(71) Applicant: Airbus Operations GmbH, Hamburg (DE)

(72) Inventor: Luc Andreani, Buchholz (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 18/588,489

(22) Filed: Feb. 27, 2024

(65) Prior Publication Data

US 2024/0317384 A1  Sep. 26, 2024

(30) Foreign Application Priority Data

Feb. 28, 2023 (EP) .................................. 23159111

(51) Int. Cl.
  *B64C 3/50* (2006.01)
  *B64C 3/32* (2006.01)

(52) U.S. Cl.
  CPC . *B64C 3/50* (2013.01); *B64C 3/32* (2013.01)

(58) Field of Classification Search
  CPC .................................. B64C 9/02; B64C 3/32
  See application file for complete search history.

(56) References Cited

U.S. PATENT DOCUMENTS

| | | | | |
|---|---|---|---|---|
| 4,995,575 A | * | 2/1991 | Stephenson | B64C 9/16 244/216 |
| 2011/0101174 A1 | | 5/2011 | Voss et al. | |
| 2020/0115033 A1 | * | 4/2020 | Tsai | B64C 9/20 |

FOREIGN PATENT DOCUMENTS

| | | |
|---|---|---|
| EP | 0356142 A2 | 2/1990 |
| EP | 2578489 A2 | 4/2013 |
| WO | 2009019011 A2 | 2/2009 |
| WO | WO-2011020593 A2 * 2/2011 | ............... B64C 9/22 |

OTHER PUBLICATIONS

PE2E English Translation of WO-2011020593-A2 (Year: 2011).*
Extended European Search Report for EP Application No. 23159111.6 mailed Aug. 21, 2023, 5 pages.

* cited by examiner

*Primary Examiner* — Nicholas McFall
*Assistant Examiner* — Eric Acosta
(74) *Attorney, Agent, or Firm* — Nixon & Vanderhye P.C.

(57) ABSTRACT

An aircraft component support arrangement for connecting an aircraft component to an aircraft wing is disclosed including a component support and an attachment device for attaching the component support to a wing structure. The attachment device includes first to third connection means for connecting the component support to the wing structure, the first to third connection means each including a floating bearing permitting linear movement in direction of a first to third axis, respectively, and angular rotation about a central point in two orthogonal directions. The first to third connection means are spaced apart from each other in two dimensions to connect the component support at three different locations to the wing structure. At least one of the first to third axes has a different orientation to the others of the first to third axes.

14 Claims, 10 Drawing Sheets

AIRCRAFT COMPONENT SUPPORT ARRANGEMENT, HIGH-LIFT SYSTEM, AIRCRAFT WING AND AIRCRAFT

CROSS REFERENCE TO RELATED APPLICATION

This application claims priority to European Patent Application Number EP 23159111.6, filed Feb. 28, 2023, the entire contents of which is hereby incorporated by reference.

BACKGROUND

The present disclosure relates to an aircraft component support arrangement for connecting an aircraft component to an aircraft wing, including a component support and an attachment device for attaching the component support to a wing structure. Furthermore, the disclosure relates to a high-lift system, an aircraft wing and an aircraft having such an aircraft component support arrangement.

More specifically, the present disclosure relates to solutions for mounting a fixed structure for supporting an aircraft component to a wing. For example, the aircraft component may be flap track or any other moving mechanism for moving a control surface element such as a flap, a slat or the like, but the aircraft component could also be an engine or any other aircraft part that is carried by the wing. Hence, the component support could be an engine pylon or any other supporting structure that is carried by the wing.

For background information, reference is made to WO 2009/019 011A2 disclosing a control surface support arrangement for movably supporting a control surface element, especially a flap of a high-lift system, of an aircraft, including a control surface support and an attachment device for attaching the control surface support to an aircraft structure, especially an aircraft wing structure.

SUMMARY

The present invention encompasses enhancing an attachment device for attaching a component support to an aircraft wing such that it has a simple and compact design and has a better performance in handling local deformations.

The invention also contemplates having an aircraft component support arrangement for connecting an aircraft component to an aircraft wing, including a component support and an attachment device for attaching the component support to a wing structure of the aircraft wing, the attachment device comprising:

a first connection means for connecting the component support to the wing structure, the first connection means comprising a first floating bearing permitting linear movement in direction of a first axis and angular rotation about a central point in two orthogonal directions, a second connection means for connecting the component support to the wing structure, the second connection means comprising a second floating bearing permitting linear movement in direction of a second axis and angular rotation about a central point in two orthogonal directions, a third connection means for connecting the component support to the wing structure, the third connection means comprising a third floating bearing permitting linear movement in direction of a third axis and angular rotation about a central point in two orthogonal directions, wherein the first to third connection means are spaced apart from each other in two dimensions to connect the component support at three different locations to the wing structure and wherein at least one of the first to third axes has a different orientation to the others of the first to third axes.

According to an exemplary embodiment, the first and second axes may be oriented parallel to each other and are spaced apart from each other wherein the third axis has at least one direction component perpendicular to the first and second axes.

The first to third floating bearings may comprise spherical bearings or spherical plain bearings.

Each of the first to third connection means may comprise a bolt to be connected to one of component support and the wing structure wherein the spherical bearing is movable in direction of the bolt axis and has a lug connected to the other of the component support and the wing structure.

The first connection means may be part of a front attachment of the component support, and the second and third connection may be parts of a rear attachment of the component support.

The component support may be chosen from the group consisting of a control surface support for movably supporting a control surface, a high-lift control surface element for movably supporting a control surface element of a high-lift system, a flap support for movably supporting a flap moving mechanism of a flap, and an engine pylon.

The first and second axes may be directed in the flight direction and are spaced apart from each other in spanwise direction. The third axis may be directed in a horizontal direction and/or has at least a direction component extending in the spanwise direction.

The attachment device may comprise only floating bearings and no fixed bearing.

According to an exemplary embodiment, the invention also may contemplate providing a high-lift system for an aircraft, comprising a high-lift control surface element and an aircraft component support arrangement according to any of the aforementioned embodiments for movably supporting the high-lift control surface element.

The high-lift system may be configured as a flap device wherein the high-lift control surface element is a flap and the aircraft component support arrangement is configured to movably supporting the flap on a trailing edge region of the aircraft wing.

According to an exemplary embodiment, an aircraft wing is disclosed comprising an aircraft wing structure, especially a wing box, and an aircraft component support arrangement according to any of the aforementioned embodiments for connecting an aircraft component to the wing.

The aircraft component may be a high-lift control surface element, especially a flap. The aircraft component support arrangement may support a flap moving mechanism for moving the flap and is attached to the wing structure by means of the attachment device.

According to an exemplary embodiment, an aircraft is disclosed comprising an aircraft component support arrangement, a high-lift system and/or an aircraft wing according to any of the aforementioned embodiments.

The present disclosure may provide an improved design for mounting a fixed structure to a wing. According to an exemplary embodiment, the fixed structure is a control surface support such as a support for a flap track or any other control surface element moving mechanism, but it could equally be an engine pylon or another aircraft structure to be carried on the wing.

According to an exemplary embodiment, an aircraft wing attachment concept is disclosed for holding aircraft components to be carried on the wing. Some exemplary embodiments are related to a wing for holding high-lift devices like flaps.

According to an exemplary embodiment, a flap support attachment concept is disclosed.

According to an exemplary embodiment, the flaps are mounted on flap support structures, which are transferring the flaps-loads to the wing structure such as a wing box and which are also part of the high-lift mechanisms for deploying the flaps. Examples for the component support are flap support beams or flap supports.

Most of the flap loads are transferred by the support beams/ribs into the wing box. According to an exemplary embodiment, the highly loaded structural connection between the wing box and the support beams is designed with a front attachment and a rear attachment. Some exemplary embodiments are mainly related to the mechanical connection of the front attachment and the rear attachment.

According to an exemplary embodiment, the attachment device is designed as dual load path connection (DLP) with a main load path that normally carries all the load and a secondary load path acting as a failsafe attachment. Some exemplary embodiments of the invention relate to improvements of the main load path, and elements of the secondary load path will not be described in detail.

Some exemplary embodiments of the invention are directed to an isostatic three floating lug attachment concept.

According to an exemplary embodiment, an attachment concept for a component support consists of three floating lugs in different orientation. Each lug is equipped with a floating bearing (slave function) in direction of an axis of a bolt. The simple and compact design can be easily integrated into the wing structure and can also be easily designed as dual load path (DLP) design. A rigging of the component support can be performed with shims/sleeves and eccentric bushes. The complete attachment system is isostatic, so all loads are fully determined.

The component support is a support structure configured to support any aircraft component that shall be connected to an aircraft wing. The component support may be attached via this attachment concept to a wing structure such as a wing box.

An attachment concept of exemplary embodiments may use three connecting means with floating bearings has one or several or all of the following benefits: 1) compact design, helps reducing the structural weight and size of fairings; 2) additional space behind a rear spar (no spigot bracket or similar), more space for system installation purposes; 3) easy integration into the wing box; 4) isostatic design of the attachment concept (no constraint loads under deformation); 5) dual load path design can be easily integrated, with a lug to lug design and a dual load path bolt connection; and, 6) with eccentric bushes or bolts and shim plated the rigging of the component support, especially of support beams/ribs, can be performed.

According to exemplary embodiments, the isostatic floating lug concept comprises three spherical bearings or consists of three spherical bearings. Each spherical bearing has a lateral degree of freedom (1 DoF) in the direction of their main axis (e.g. a bolt axis). Hence, the spherical bearings are only taking loads in their preferred radial load direction.

The first to third spherical bearings connect the wing structure with the component support via lugs. At least one main axis of the spherical bearings (e.g. bolt axis) is orientated differently in relation to the other two main axes (e.g. bolt axes). This has the advantage that the attachment device is able to counteract the axial loads. According to an exemplary embodiment, the first axis of the first connecting means for establishing a front attachment and the second axis of the second connecting means which is one of two connecting means for establishing a rear attachment are oriented in the same direction, e.g. in the line of flight, and the third axis of the third connecting means which establishes together with the second connection means, the rear attachment, is oriented perpendicularly in relation to the first and second axes.

Each connecting means may comprise a bolt. On each bolt, a spherical bearing may be mounted, to avoid the transfer of moment reactions. So overall, six reaction forces are transferred by the attachment device in space. Thus, the attachment device is isostatic.

BRIEF DESCRIPTION OF THE DRAWINGS

For an understanding of embodiments of the disclosure, reference is now made to the following description taken in conjunction with the accompanying drawings, in which.

DETAILED DESCRIPTION OF SOME EMBODIMENTS

Some embodiments will now be described with reference to the Figures.

Figure 1:
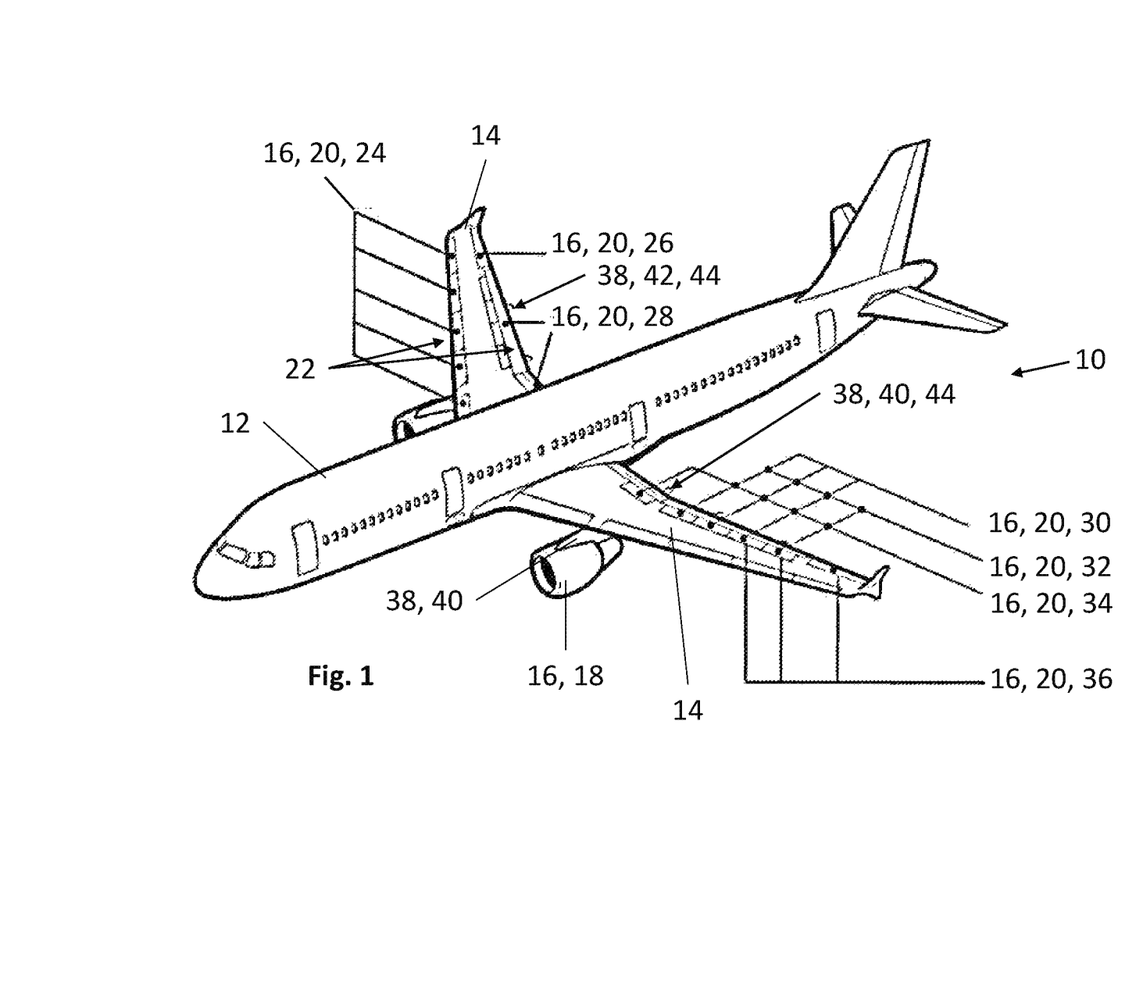
FIG. 1 is a perspective view of an aircraft with wings and several aircraft components such as control surfaces and engines carried by the wings.
Figure 2:
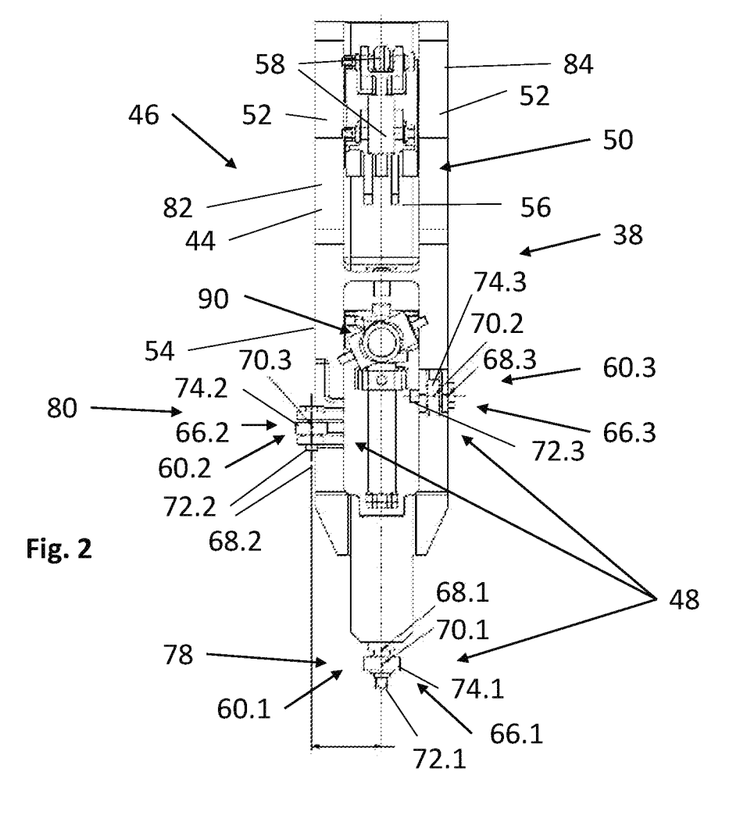
FIG. 2 is a top view of an embodiment of an aircraft component support arrangement with a component support for supporting an aircraft component and an attachment device for attaching the component support to the wing.
Figure 3:
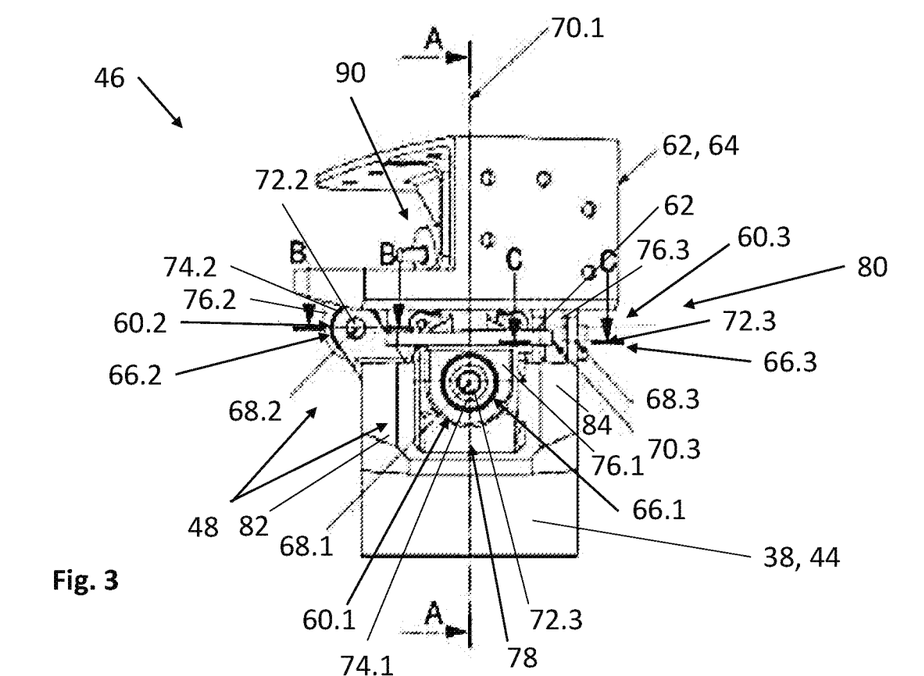
FIG. 3 is a front view of the aircraft component support arrangement of FIG. 2.
Figure 4:
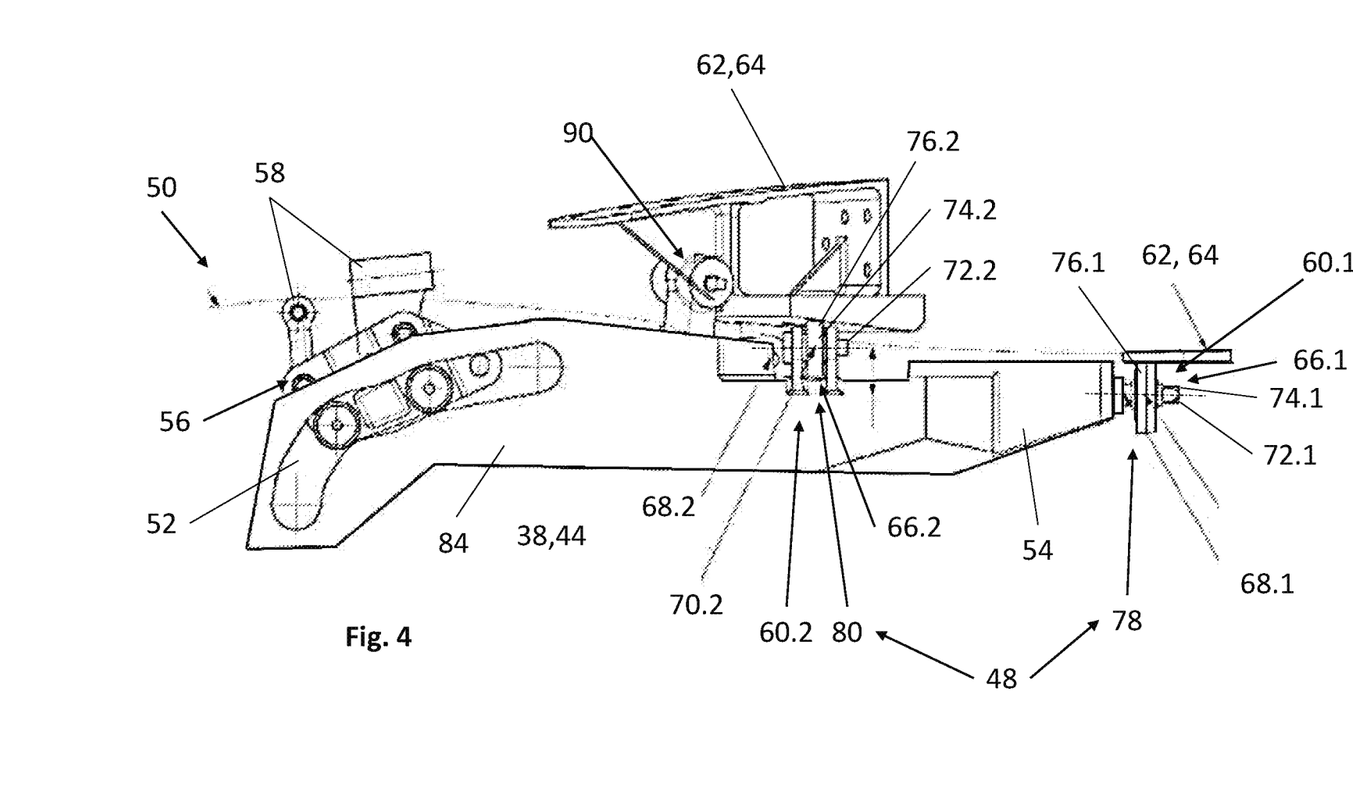
FIG. 4 is a left side view of the aircraft component support arrangement of FIG. 2.

FIG. 1 shows an embodiment of an aircraft 10 comprising a fuselage 12, wings 14 and several aircraft components 16 carried by the wings 14. Some examples for the aircraft components 16 are, but not limited to, engines 18 or control surface elements 20, especially of a high-lift system 22. The control surface elements 20 comprise slats 24, ailerons 26, flaps 28, speed brakes 30, roll spoilers 32, lift dumpers 34 and load alleviation function elements 36.

Each aircraft component 16 is supported on structure attached to the wing 14 which is referred to as component support 38 in the following. Some examples for the component support 38 include, but not limited to, an engine pylon 40 or a control surface element support 42, such as a flap support 44, for movably supporting one or several of the control surface elements 20, e.g., one or several of the flaps 28. In the following, an attachment concept for attaching the component support 38 to the associated wing 14 is explained, by way of example, with reference to an attachment of a flap support 44. The same attachment concept is applicable to other component supports such as the engine pylon 40 or other control surface element supports 42.

Referring to FIGS. 2 to 6, an aircraft component support arrangement 46 for connecting the aircraft component 16 to the aircraft wing 14 is shown. The component support arrangement 46 includes the component support 38, e.g., the flap support 44, and an attachment device 48.

The flap support 44 is configured to support a moving mechanism 50 for moving the flap 28 between a fully retracted and a fully extended position. In the embodiments shown, the flap support 44 includes a flap track 52 provided on a bifurcated flap support beam 54. A flap carriage 56 is guided in the flap track 52. The flap carriage 56 has a linkage 58 that is connected to the flap 28 (not shown here) in use.

The attachment device 48 includes a first connecting means 60.1, a second connecting means 60.2, and a third connecting means 60.3. The connecting means 60.1, 60.2, 60.3 are configured to connect the component support 38 to a wing structure 62 such as a wing box 64.

The first connecting means 60.1 comprises a first floating bearing 66.1 permitting linear movement in direction of a first axis 68.1 and angular rotation about a central point in two orthogonal directions, namely about the first axis 68.1 and a first transversal axis 70.1. The second connecting means 60.2 comprises a second floating bearing 66.2 permitting linear movement in direction of a second axis 68.2 and angular rotation about a central point in two orthogonal directions, namely about the second axis 68.2 and about a second transversal axis 70.2. The third connecting means 60.3 comprises a third floating bearing 66.3 permitting linear movement in direction of a third axis 68.3 and angular rotation about a central point in two orthogonal directions, namely about the third axis 68.3 and a third transversal axis 70.3.

A floating bearing is a bearing which only bears radial loads. In the axial direction it is able to compensate for longitudinal expansion of one of the connecting partners either by its inner geometry or through a sliding fit. Different designs are possible for the floating bearings 66.1, 66.2, 66.3. In the embodiments shown, each of the floating bearings 66.1, 66.2, 66.3 include a bolt 72.1, 72.2, 72.3 to be connected to one of the connecting partners and a spherical bearing 74.1, 74.2, 74.3 that can be shifted linearly along the bolt axis defining the first to third axis 68.1, 68.2, 68.3 and that connects the bolt in a rotatable manner to the other connecting partner. In the embodiments shown, the bolts 72.1, 72.2, 72.3 are mounted to the component support 38, i.e. the flap support 44, while lugs 76.1, 76.2, 76.3 including the outer bearing shells of the spherical bearings 74.1, 74.2, 74.3 are mounted to the wing structure 62.

At least one of the first to third axes 68.1, 68.2, 68.3 has another orientation in relation to the other two of the first to third axes 68.1, 68.2, 68.3. In the embodiments shown, the first and second axes 68.1, 68.2 are oriented in the line of flight, while the third axis 68.2 is perpendicular thereto (e.g., in a horizontal direction).

The attachment device 48 has a front attachment 78 constituted by the first connecting means 60.1 and a rear attachment 80 constituted by the second and third connecting means 60.2, 60.3. The second connecting means 60.2 is located on the inboard side of the component support 38, while the third connecting means 60.3 is located on the outboard side of the component support 38, in the embodiments shown, the second connecting means 60.2 connects an inboard rib 82 of the flap support beam 54 to the wing structure 62, while the third connecting means 60.3 connects an outboard rib 84 of the flap support beam 54 to the wing structure 54.

Figure 7:
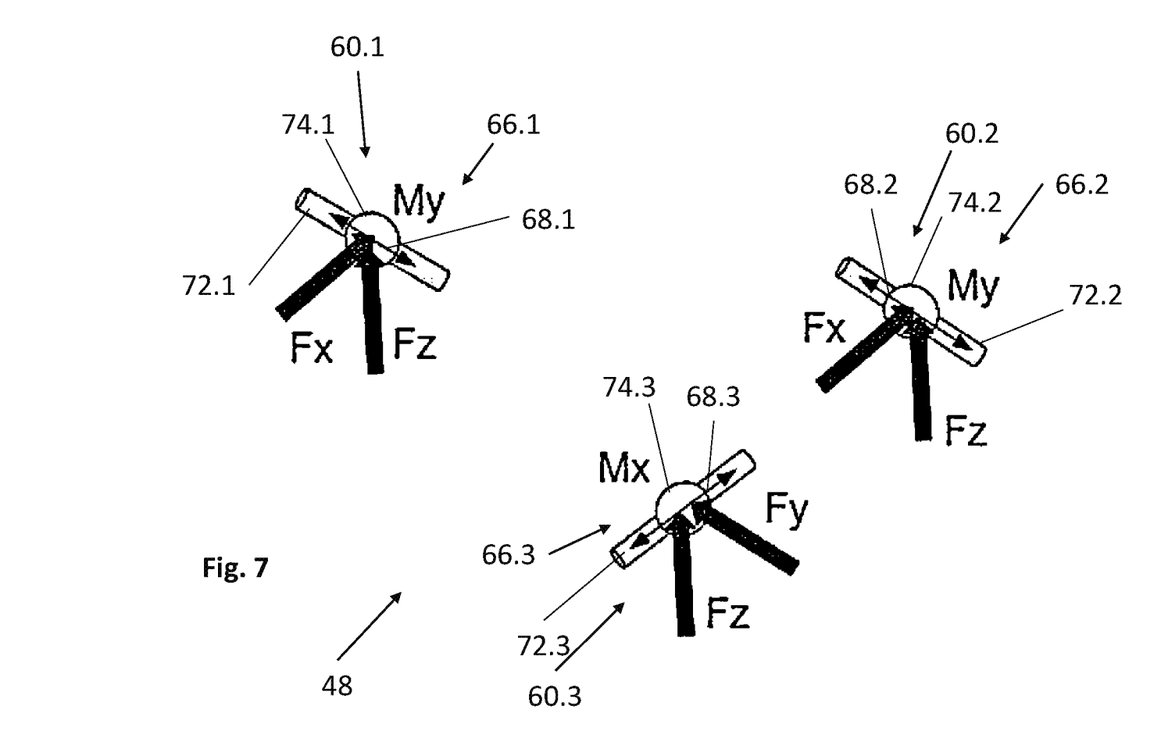
FIG. 7 is a diagram illustrating a first to third connection means of the attachment device and loads and reaction forces acting thereon.
Figure 8:
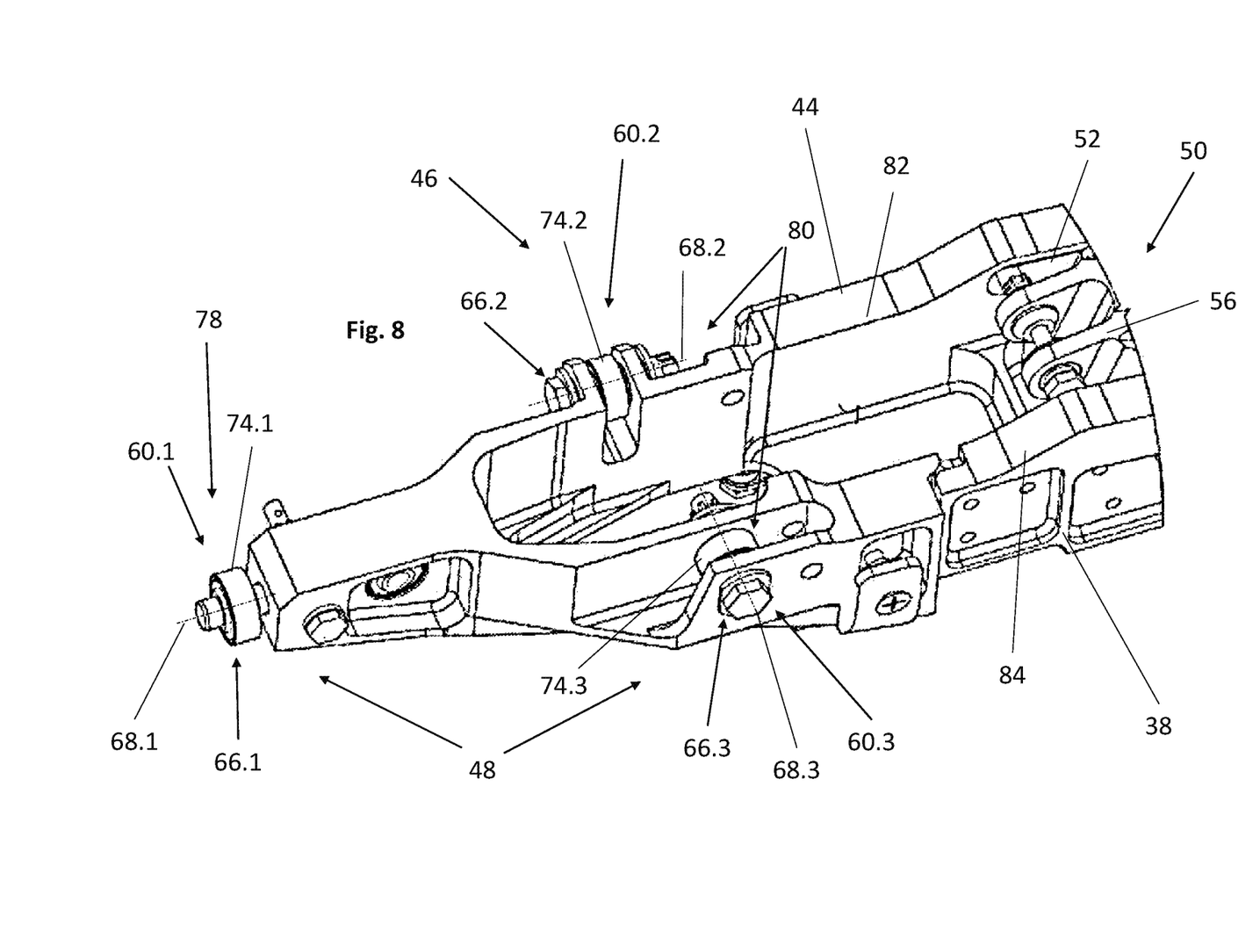
FIG. 8 is a perspective view of the front part of the component support together with parts of the first to third connection means.
Figure 9:
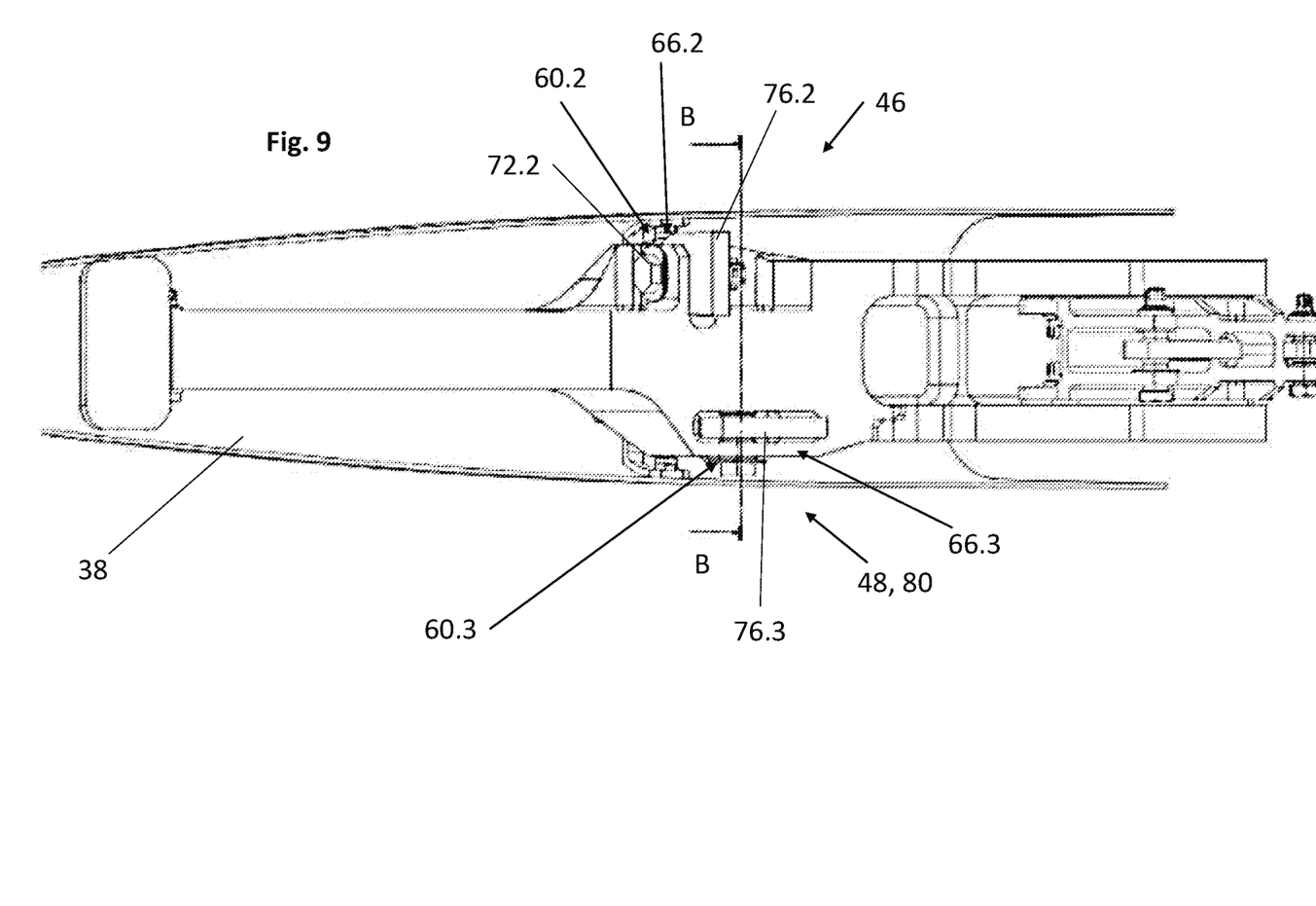
FIG. 9 is a top view of a part of the component support for illustrating a rear attachment of the attachment device.

Thus, the connecting means 60.1, 60.2, 60.3 are located on three different connecting points arranged at the apexes of a triangle, as this is also illustrated in FIG. 7.

FIG. 7 shows the reaction forces for each bolt 72.1, 72.2, 72.3. In FIG. 7, the x-direction is the horizontal direction perpendicular to the line of flight, the y-direction is the direction in line of flight, and the z-direction is the vertical direction.

FIG. 7 illustrates the main function of the three axes 68.1, 68.2, 68.3 of the bolts 72.1, 72.2, 72.3 with their spherical bearings 74.1, 74.2, 74.3. Each spherical bearing 74.1, 74.2, 74.3 with the associated bolt 72.1, 72.2, 72.3 has a degree of freedom in axial direction, so the spherical bearings 74.1, 74.2, 74.3 are able to slide (move) along the bolt axis direction in case of local deformations or displacements.

The attachment concept is based on three floating bearings 66.1, 66.2, 66.3 without any master bearing (e.g., a fixed bearing that defines a reference position), by aligning the axes 68.1, 68.2, 68.3 for counteracting all external loads. The wing attachment lugs 76.1, 76.2, 76.3 are able to slide on bolt bushes 86 in axial direction, because on each side of the lugs 76.1, 76.2, 76.3, gaps 88 are provided or incorporated in the design (see FIG. 11).

Referring back to FIG. 7, all connecting means 60.1, 60.2, 60.3 bear loads in their main radial direction. Hence, all connecting means 60.1, 60.2, 60.3 bear loads in the vertical direction. While the first and second connecting means 60.1, 60.2 bear loads directed horizontally perpendicular to the line of flight, the third connecting means 60.3 bears loads in direction of line of flight. The arising of constraint loads under deformation of any of the connecting partners is avoided due to the different degrees of freedom of the connecting means 60.1, 60.2, 60.3. The attachment device 48 consists of floating bearings 66.1, 66.2, 66.3 only and has no fixed bearings. The attachment device 48 is a fully isostatic system, and any reaction force is fully determined.

Figure 5:
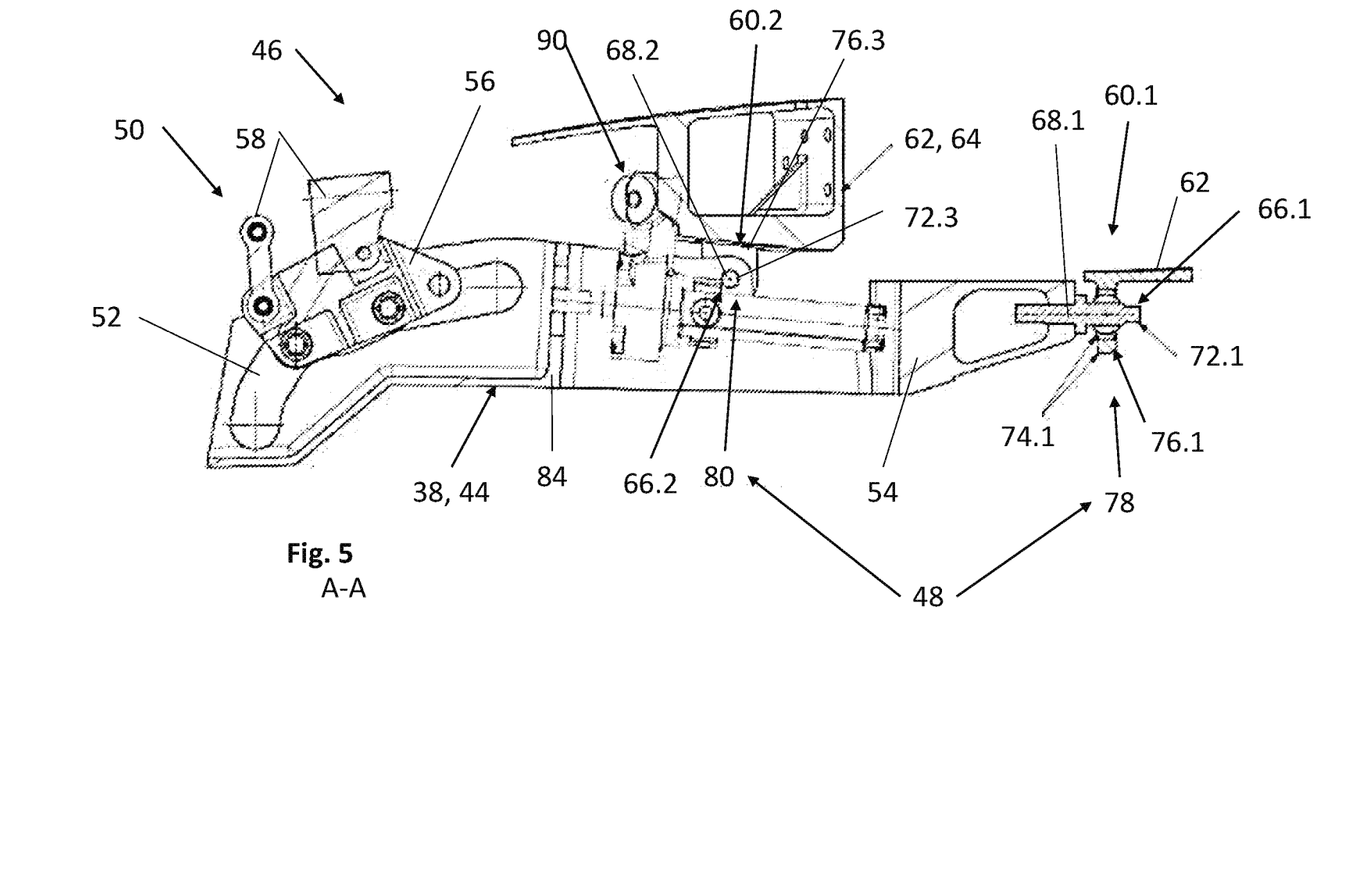
FIG. 5 is a sectional view along the plane A-A of the aircraft component support arrangement of FIG. 2.
Figure 6:
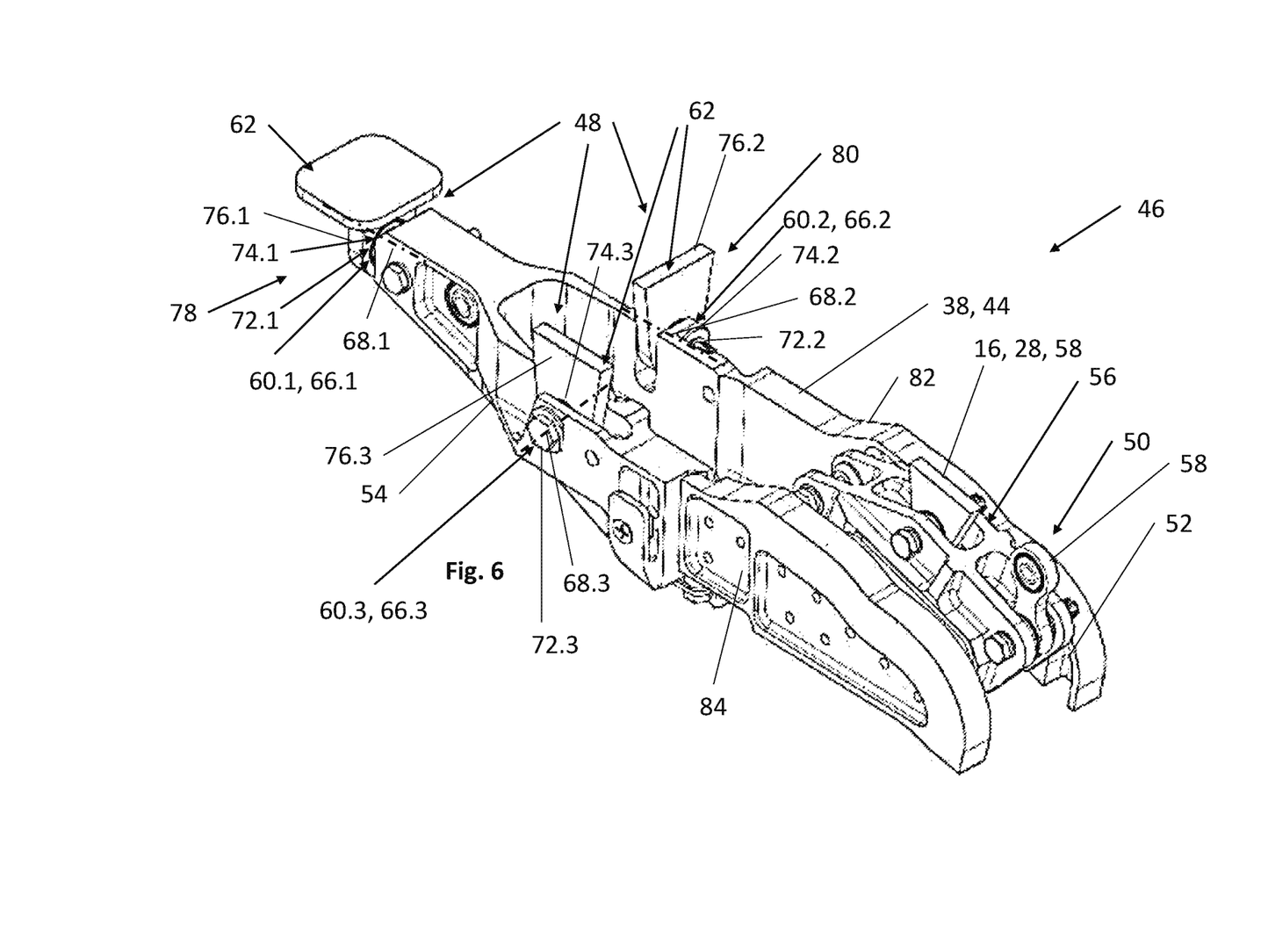
FIG. 6 is a perspective view of the aircraft component support arrangement.
Figure 10:
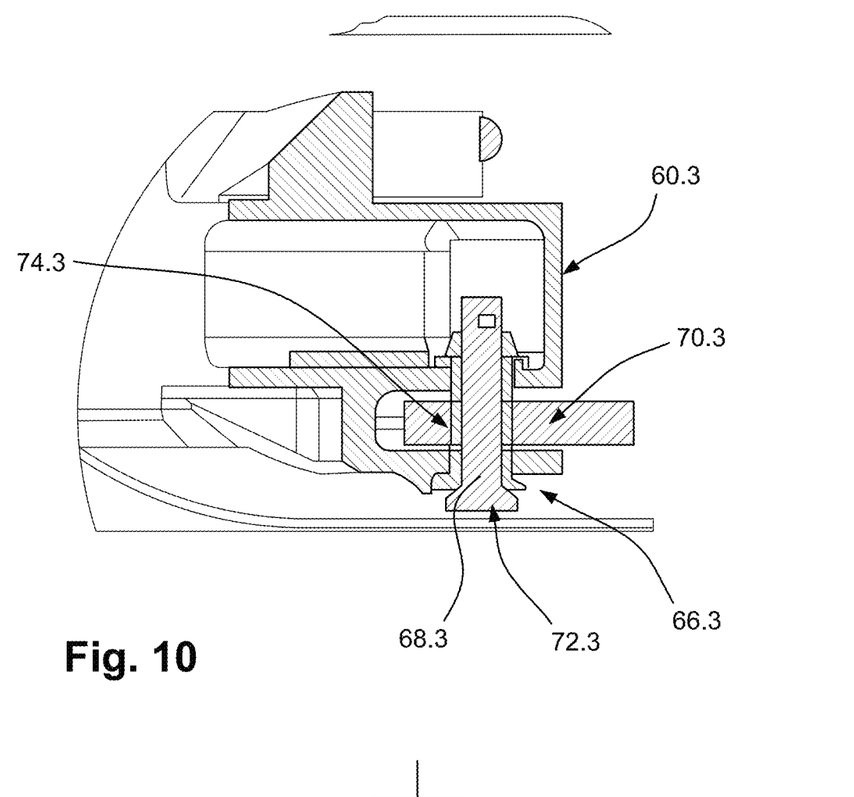
FIG. 10 is a sectional view along the plane B-B of FIG. 9.
Figure 11:
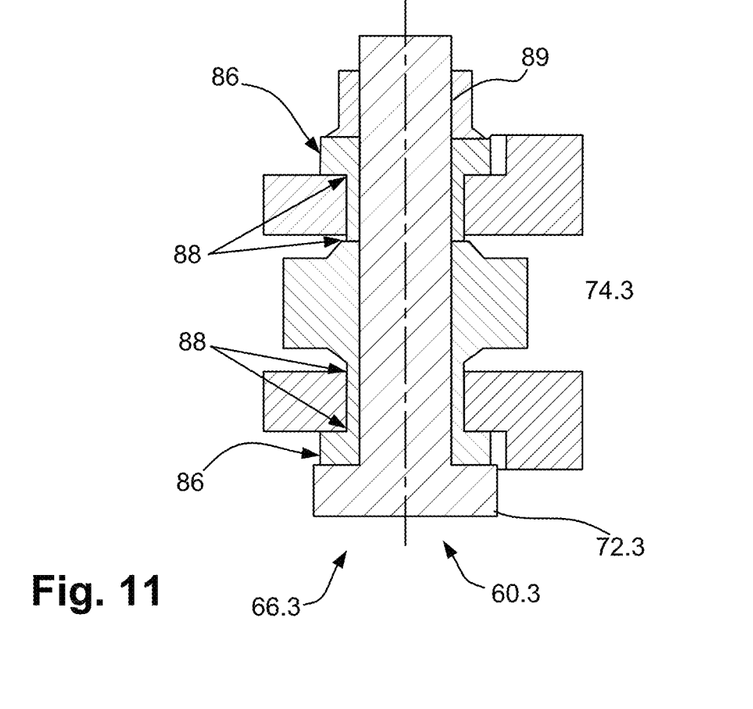
FIG. 11 is an enlarged view of a detail of FIG. 10 illustrating a design of the connecting means.

Detailed exemplary embodiments of the connecting means 60.1, 60.2, 60.3 are shown in FIGS. 5, and 8 to 10, wherein FIGS. 5 and 10 and 11 are sectional views. As can be noted from these Figures, the rigging of the flap support beam 54 and its ribs 82, 84 is performed with eccentric bushes 86 (alternatively, in further embodiments, not shown, with eccentric bolts 72.1, 72.2, 72.3). For providing the axial sliding capability under deformation, the bushes 86 are configured as sliding bushes, and a gap 88 is provided between wing lugs on each side (see FIG. 11). The bolt 72.1-72.3 is fixed with a nut 89.

While the main load in use is borne by the attachment device 48, the concept easily allows an integration of a dual load path design. A second load path 90, which functions as a "wating" fail safe load path that is not under load in normal operation is shown in FIGS. 2 to 5.

In order to improve the attachments of aircraft components 16 to an aircraft wing 14 with regard to simple design and better load distribution an aircraft component support arrangement 46 for connecting the aircraft component 16 to an aircraft wing 14 has been described. The aircraft component support arrangement 46 includes a component support 38 and an attachment device 48 for attaching the component support 38 to a wing structure 62. The attachment device 48 comprises a first to third connection means 60.1, 60.2, 60.3 for connecting the component support 38 to the wing structure 62, the first to third connection means 60.1, 60.2, 60.3 each comprising a floating bearing 66.1, 66.2, 66.3 permitting linear movement in direction of a first to third axis 68.1, 68.2, 68.3, respectively, and angular rotation about a central point in two orthogonal directions, wherein the first to third connection means 60.1, 60.2, 60.3 are spaced apart from each other in two dimensions to connect the component support 38 at three different locations to the wing structure (62 and wherein at least one of the first to third axes 68.1, 68.2, 68.3 has a different orientation to the others of the first to third axes 68.1, 68.2, 68.3.

While at least one exemplary embodiment is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft component support arrangement for connecting an aircraft component to an aircraft wing, including a component support and an attachment device for attaching the component support to a wing structure, the attachment device, comprising:
   a first connection means for connecting the component support to the wing structure, the first connection means consisting of a first bolt and a first floating bearing permitting linear movement in direction of a first axis and angular rotation about a central point in two orthogonal directions,
   a second connection means for connecting the component support to the wing structure, the second connection means consisting of a second bolt and a second floating bearing permitting linear movement in direction of a second axis and angular rotation about a central point in two orthogonal directions,
   a third connection means for connecting the component support to the wing structure, the third connection means consisting of a third bolt and a third floating bearing permitting linear movement in direction of a third axis and angular rotation about a central point in two orthogonal directions,
   wherein the first to third connection means are spaced apart from each other in two dimensions to connect the component support at three different locations to the wing structure, and
   wherein at least one of the first to third axes has a different orientation to the others of the first to third axes.

2. The aircraft component support arrangement according to claim 1, wherein the first and second axes are oriented parallel to each other and are spaced apart from each other wherein the third axis has at least one direction component perpendicular to the first and second axes.

3. The aircraft component support arrangement according to claim 1, wherein each of the first to third floating bearings comprises a spherical bearing.

4. The aircraft component support arrangement according to claim 3, wherein the spherical bearing is movable in direction of the bolt axis and has a lug configured to be connected to the other of the component support and the wing structure.

5. The aircraft component support arrangement according to claim 1, wherein the first connection means is part of a front attachment of the component support, and the second and third connection means are parts of a rear attachment of the component support.

6. The aircraft component support arrangement according to claim 1, wherein the component support is chosen from the group consisting of
   a control surface element support for movably supporting a control surface element,
   a high-lift control surface element for movably supporting a control surface element of a high-lift system,
   a flap support for movably supporting a flap moving mechanism of a flap, and
   an engine pylon.

7. The aircraft component support arrangement according to claim 1, wherein the first and second axes are directed in the flight direction and are spaced apart from each other in spanwise direction and/or in that the third axis is directed in a horizontal direction and/or has at least a component directed in the spanwise direction.

8. A high-lift system for an aircraft, comprising a high-lift control surface element and an aircraft component support arrangement according to claim 1, wherein the aircraft component support arrangement is configured to movably support the high-lift control surface element.

9. The high-lift system according to claim 8, wherein the high-lift control surface element is a flap and the aircraft component support arrangement is configured to movably support the flap on a trailing edge region of the aircraft wing.

10. An aircraft, comprising the high-lift system according to claim 8.

11. An aircraft wing, comprising an aircraft wing structure and the aircraft component support arrangement according to claim 1, wherein the aircraft component support arrangement is configured to connect an aircraft component to the aircraft wing.

12. The aircraft wing according to claim 11, wherein the aircraft component is a flap, wherein the aircraft component support arrangement supports a flap moving mechanism for moving the flap and is attached to the wing structure by means of the attachment device.

13. An aircraft, comprising the aircraft component support arrangement according to claim 1.

14. An aircraft, comprising the aircraft wing according to claim 11.

* * * * *